(12) United States Patent
Lee et al.

(10) Patent No.: US 8,668,608 B2
(45) Date of Patent: Mar. 11, 2014

(54) CHAIN GUIDE OF AUTOMOTIVE ENGINE

(75) Inventors: Seung Woo Lee, Seoul (KR); Sung Hwan Oh, Suwon-si (KR); Hong Kil Baek, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 197 days.

(21) Appl. No.: 13/237,329

(22) Filed: Sep. 20, 2011

(65) Prior Publication Data

US 2012/0122620 A1 May 17, 2012

(30) Foreign Application Priority Data

Nov. 16, 2010 (KR) ........................ 10-2010-0113836

(51) Int. Cl.
*F16H 7/08* (2006.01)
*F16H 7/18* (2006.01)

(52) U.S. Cl.
USPC .......................................... 474/140; 474/111

(58) Field of Classification Search
USPC .................................. 474/140, 111
See application file for complete search history.

(56) References Cited

U.S. PATENT DOCUMENTS

| 6,062,998 | A * | 5/2000 | Kumakura et al. | 474/111 |
| 2005/0090344 | A1* | 4/2005 | Foster et al. | 474/111 |
| 2007/0149329 | A1* | 6/2007 | Ota et al. | 474/111 |
| 2007/0259744 | A1* | 11/2007 | Lehtovaara et al. | 474/111 |
| 2009/0017949 | A1* | 1/2009 | Sato et al. | 474/111 |
| 2009/0075769 | A1 | 3/2009 | Shintani et al. | |
| 2010/0016105 | A1* | 1/2010 | Yoshimura et al. | 474/110 |
| 2012/0129636 | A1* | 5/2012 | Lee et al. | 474/111 |

FOREIGN PATENT DOCUMENTS

| JP | 8-303541 A | 11/1996 |
| JP | 10-288249 A | 10/1998 |
| KR | 1020020041095 A | 6/2002 |
| KR | 10-2009-0061261 A | 6/2009 |

* cited by examiner

*Primary Examiner* — William A Rivera
*Assistant Examiner* — Henry Liu
(74) *Attorney, Agent, or Firm* — Morgan, Lewis & Bockius LLP

(57) ABSTRACT

A chain guide that contacts a chain connecting a cam sprocket and a crank sprocket, and has a contact portion contacting the back of the chain in a length direction of the chain and a convex curved line in a cross-section of the contact portion.

5 Claims, 7 Drawing Sheets

CHAIN GUIDE OF AUTOMOTIVE ENGINE

CROSS-REFERENCE TO RELATED APPLICATION

This application claims priority to and the benefit of Korean Patent Application No. 10-2010-0113836 filed Nov. 16, 2010, the entire contents of which application is incorporated herein for all purposes by this reference.

BACKGROUND OF INVENTION

1. Field of Invention

The present invention relates to a chain guide connecting a cam sprocket and a crank sprocket. More particularly, the present invention relates to a chain guide that reduces friction loss by making the cross-section of a contact portion that contacts the back of a chain in the chain guide a convex curved surface.

2. Description of Related Art

A vehicle engine generally has a combustion chamber that generates power by combusting fuel, and a valve train including an intake/exhaust valve train that controls intake air and exhaust gas disposed at the combustion chamber. The valve train opens/closes the combustion chamber in accordance with a crankshaft.

The crankshaft needs to drive the camshaft so that the valve train can be operated, and the camshaft is connected with the crankshaft via a chain 30. Further, a chain tensioner 45 and a chain guide 40 are applied in case a difference of phase between the camshaft and the crankshaft is changed because the valves cannot be opened/closed according to combustion timing.

In this way, when the chain 30 and the chain tensioner 45 are equipped, the chain 30, as shown in FIG. 1, is wound around a crank sprocket 20 and a cam sprocket 10.

A tensioner arm 41 is disposed at a side of the chain 30 so that the tensioner arm 41 adjusts the tension of the chain 30 by being controlled by the chain tensioner 45, and the chain guide 40 is fixed at the other side of the chain 30.

In a chain driving system that converts a rotation force of the crankshaft 20 generated by combusting fuel into rotation of the camshaft, as shown in FIG. 1, if the engine speed increases, the moment of inertia and the driving torque of a revolving body in an engine increase, and a vertical load in a friction portion increases.

Therefore, frictional resistance between the chain 30 and the tensioner arm 41 and frictional resistance between the chain 30 and the chain guide 40 coincide, leading to deteriorated fuel consumption.

FIG. 2A is a partially cut-away perspective view of a conventional chain guide and FIG. 2B is a cross-sectional view of an "A"-"A" line of FIG. 2, and we can see that a back 35 of the chain 30 contacts the chain guide 40 at a contact surface.

Because energy loss increases as the contact surface increases, a reduction of the operation area of the frictional force is needed in order to reduce the energy loss.

An increase in the thickness of an oil film is also needed because a sufficient thickness of the oil film between the chain 30 and the chain guide 40 makes the frictional coefficient small.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a chain guide of an automotive engine having advantages of minimizing a frictional force caused by line contact by making a portion of the chain guide contacting the back of a chain form a convex curved surface, and reducing a boundary frictional force by increasing the thickness of an oil groove at both sides of the convex curved surface.

Various aspects of the present invention provide for a chain guide that contacts a chain connecting a cam sprocket and a crank sprocket. It is characterized in that the contact portion that contacts the back of the chain is formed in a length direction of the chain, and a cross-section of the contact portion is a convex curved line.

The contact portion according to various aspects of the present invention can be a plurality of contact portions that are formed at a predetermined distance from each other.

An oil groove according to various aspects of the present invention can be formed at both sides of the contact portion in a length direction of the chain in order to increase the thickness of an oil film.

A concave groove of an oil bowl according to various aspects of the present invention can be formed at an end portion of the contact portion.

The present invention reduces frictional force by making the contact portion that contacts the back of the chain in the chain guide, which contacts the chain connecting a cam sprocket and a crank sprocket, have a convex curved surface.

The oil groove formed at both ends of the convex curved surface and an oil bowl formed in the end of the contact portion increase the thickness of the oil film, and fuel consumption can be improved by reducing the boundary frictional force.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
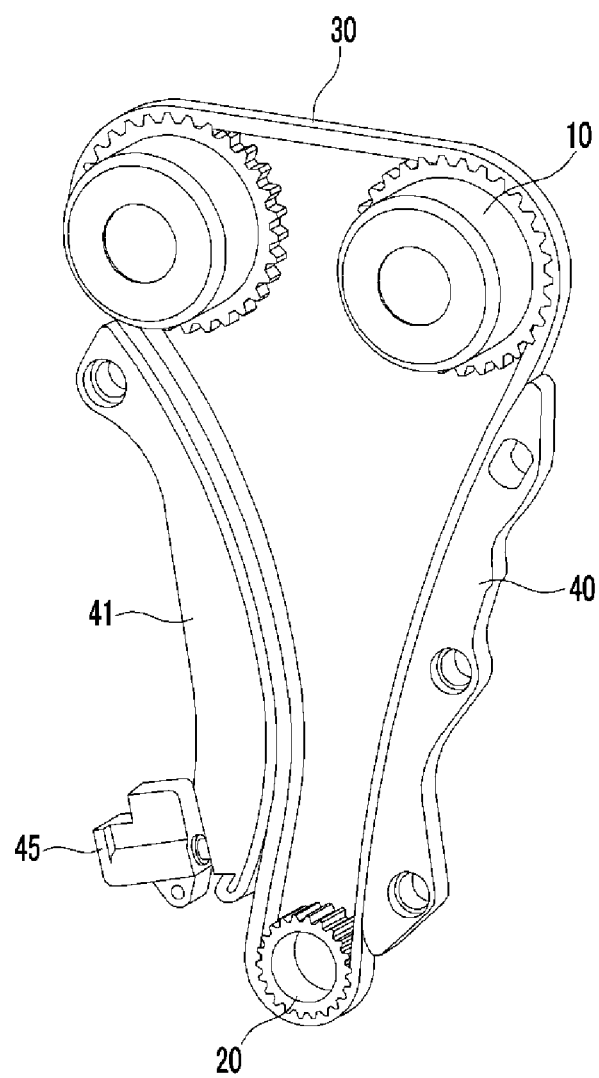
FIG. 1 is a schematic diagram of conventional chain system.
Figure 2A:
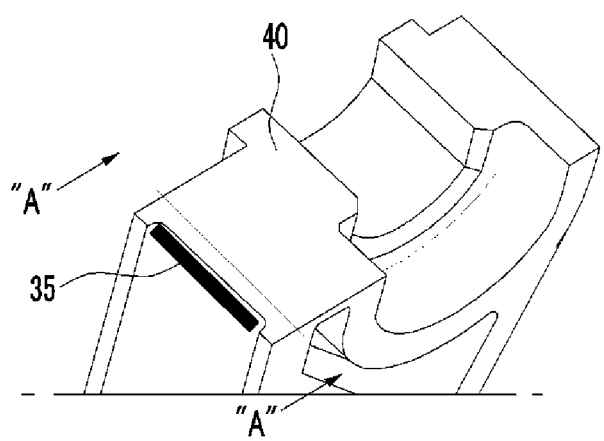
FIG. 2 is a partially cut-away perspective view of a conventional chain guide.
Figure 2B:
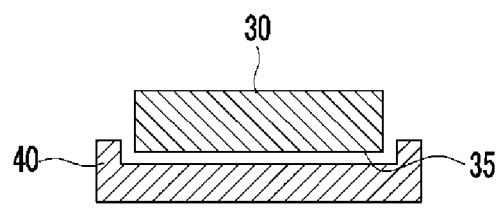

With reference to FIG. 1, various embodiments of the present invention relate to a chain guide 40 that improves sliding frictional resistance generated in a chain system between a back 35 of a chain 30 and a chain guide 140, and of which a contact portion 146 contacting the back 35 of the chain 30 is a convex curved line in cross-section.

Generally, a frictional force is represented by a vertical load multiplied by a frictional coefficient, and the energy consumed by friction is represented with a relationship of a frictional force and an operating area. Therefore, if the vertical load and the frictional coefficient are exerted in the same quantities, the energy consumed is changed depending on the size of the operating area in spite of the same frictional force.

Therefore, the vertical load, the frictional coefficient, or the frictional force needs to be reduced in order to reduce the energy loss by friction. The present invention relates to a method of reducing the energy loss by reducing the friction coefficient and the operating area applied with the frictional force.

As noted above, FIG. 3 is a graph representing effects of a frictional coefficient and thickness of an oil film on sliding speed, and it can be seen that the frictional coefficient grow smaller as the thickness of the oil film becomes larger.

While the frictional coefficient n area 1 is large, the frictional coefficient in area 3 which is an elastic fluid lubrication area increases when the thickness of the oil film is reduced greatly although the sliding speed increases.

Figure 3:
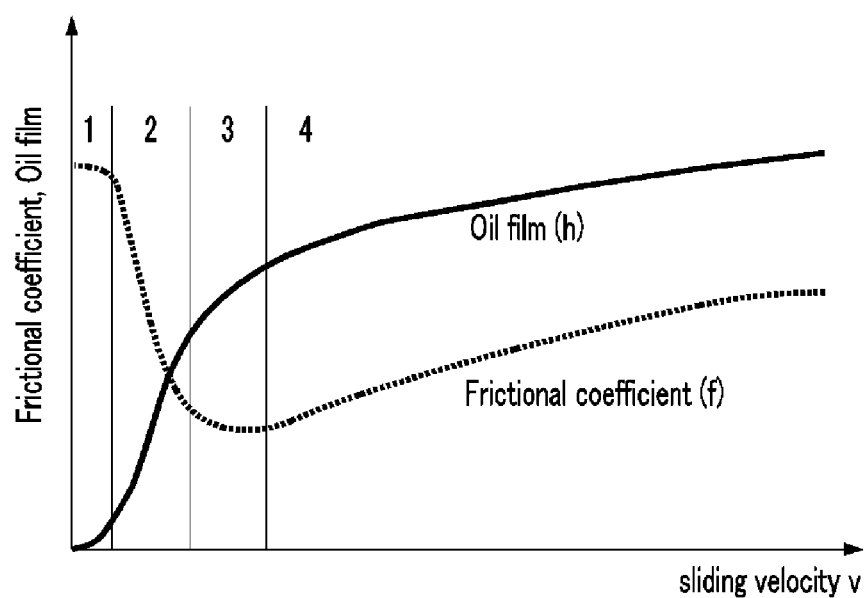
FIG. 3 is a graph representing effects of a frictional coefficient and thickness of an oil film on sliding speed.

Area 4 in FIG. 3 is a hydrodynamic lubrication area, and area 2 is a mixed friction area.

Figure 4A:
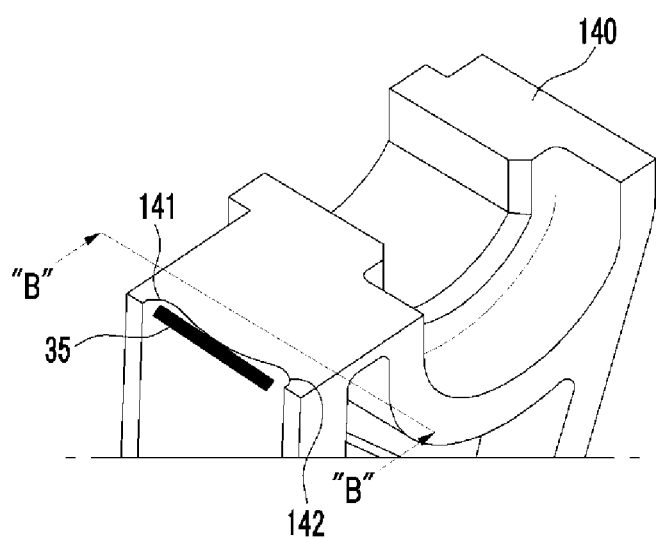
FIG. 4 is a partially cut-away perspective view of an exemplary chain guide according to the present invention.
Figure 4B:
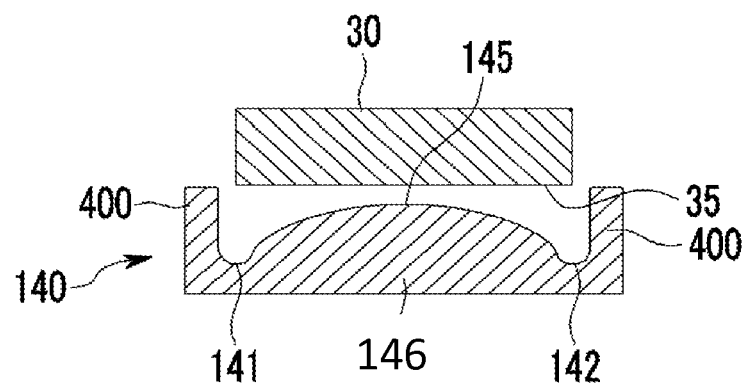
Figures 5, 5A:
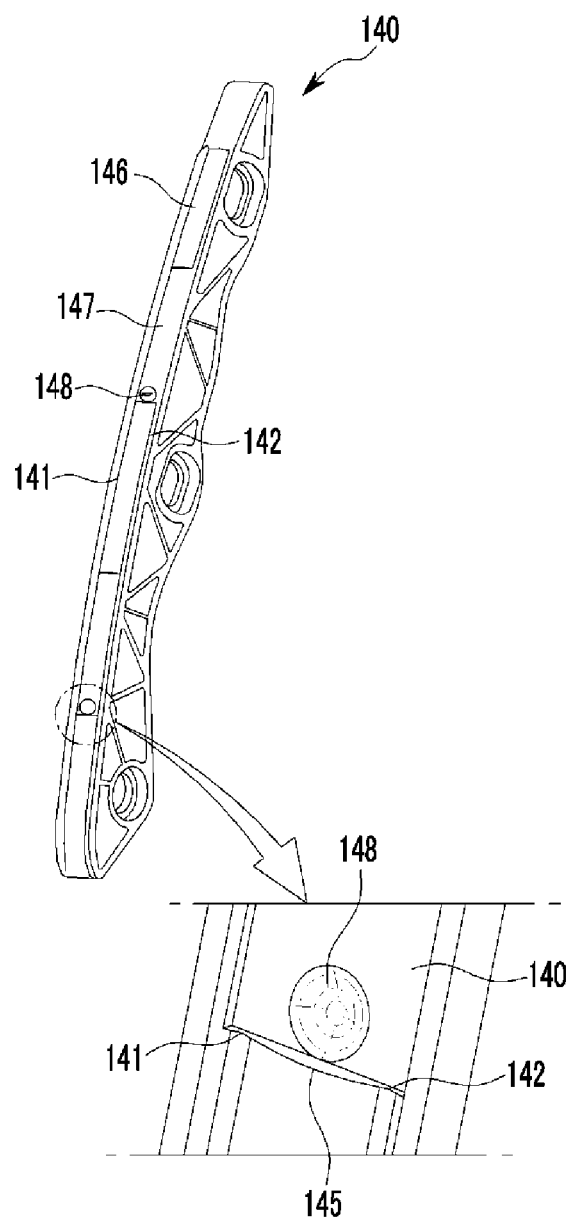
FIG. 5 is a perspective view of an exemplary chain guide according to the present invention.
FIG. 5A is a perspective view of a partially enlarged chain guide illustrated in FIG. 5.

As noted above, FIG. 4A is a partially cut-away perspective view of a chain guide 140 according to various embodiments of the present invention, and FIG. 4B shows a cross-sectional view of line "B"-"B" of FIG. 4A.

In the chain guide 140 contacting a chain 30 that connects a cam sprocket 10 and a crank sprocket 20 according to various embodiments of the present invention, a cross-section of the contact portion 146 contacting the back 35 of the chain 30 is formed as a convex curved line in a length direction of the chain 30, and multiple contact portions 146 are formed at a predetermined distance from each other.

By making the cross-section of the contact portion 146 a convex curved line, the friction operating area is reduced by changing line contact into surface contact with the back 35 of the chain 30, so the present invention can minimize the energy loss caused by the friction.

The multiple contact portions 146 are formed in the length direction of a chain 30, and non-contact portions 147 are formed between the contact portions 146.

The non-contact portions 147 are formed as flat surface, so that the back 35 of the chain 30 can contact the convex curved surface 145 of the contact portions 146 and cannot contact the non-contact portions 147.

Thereby, an area contacting the chain 30 can be minimized, and friction resistance can be reduced by minimizing the contact area.

In addition, concave oil grooves 141 and 142 according to various embodiments of the present invention are formed at both sides of a contact portion 146 in the length direction of the chain 30, so that the thickness of an oil film between the chain 30 and the chain guide 140, which are subjected to a vertical load and move relatively, is increased. For example, as shown in FIG. 4B, groove 141 is formed between the left side 400 of the chain guide 140 and the contact portion 146 and groove 142 is formed between the right side 400 of the chain guide 140 and the contact portion 146.

Thereby, a boundary friction condition due to a deficient oil film in the contact portion 146 that contacts the back 35 of the chain 30 and the chain guide 140 is changed into an elasto-hydrodynamic lubrication condition, and the frictional coefficient is reduced.

In this way, the energy lost by friction can be reduced by reducing the friction coefficient.

An oil bowl 148 with a concave shape is formed at an end portion of a contact portion 146 so that sufficient oil can be available.

In other words, oil is stored in the oil bowl 148 so that oil can be continuously supplied in order to reduce the frictional resistance between the chain 30 and the chain guide 140.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A chain guide that contacts a chain connecting a cam sprocket and a crank sprocket, the chain guide comprising:
a contact portion that contacts a back of the chain and extends along a length of the chain, wherein the contact portion is formed at a central portion of the chain guide in a width direction of the chain and has a convex cross-section in the width direction of the chain, thereby forming a line contact with the back of the chain; and
a concave oil groove that is formed between the contact portion and one side of the chain guide in the width direction of the chain and extends along the length of the chain to increase a thickness of an oil film on the contact portion.

2. The chain guide of claim 1, wherein a plurality of contact portions are formed at a predetermined distance from each other along the length of the chain.

3. The chain guide of claim 1, wherein another oil groove is formed between the contact portion and an opposing side of the chain guide in the width direction of the chain and extends along the length of the chain.

4. The chain guide of claim 2, wherein another oil groove is formed between the contact portion and an opposing side of the chain guide in the width direction of the chain and extends along the length of the chain.

5. The chain guide of claim 1, wherein a concave groove of an oil bowl is formed at an end portion of the contact portion.

* * * * *